United States Patent [19]
Yoshida

[11] B 3,999,646
[45] Dec. 28, 1976

[54] CYLINDRICAL BELT CONVEYOR SYSTEM

[75] Inventor: Yoshimasa Yoshida, Tokyo, Japan

[73] Assignees: Yoshimasa Yoshida; Marubeni Corporation, both of Tokyo, Japan

[22] Filed: Sept. 5, 1974

[21] Appl. No.: 503,521

[44] Published under the second Trial Voluntary Protest Program on March 16, 1976 as document No. B 503,521.

[30] Foreign Application Priority Data

Sept. 27, 1973 Japan .............................. 48-107933

[52] U.S. Cl. ................................ 198/680; 198/819
[51] Int. Cl.² ....................................... B65G 15/00
[58] Field of Search ...... 198/129, 109, 191, 192 R, 198/192 A

[56] References Cited
UNITED STATES PATENTS

| | | | |
|---|---|---|---|
| 2,886,167 | 5/1959 | Lanier | 198/191 |
| 2,925,903 | 2/1960 | Robbins | 198/191 |
| 2,955,699 | 10/1960 | Lanier, Jr. | 198/191 |

*Primary Examiner*—James B. Marbert
*Attorney, Agent, or Firm*—Oblon, Fisher, Spivak, McClelland & Maier

[57] ABSTRACT

A conveyor system, adapted to move a cylindrical belt carrying therein a material, particularly a granular or powdered material, the cylindrical belt being suspended by hangers from wire ropes, further comprising driving means adapted to drive a set of pulleys and wheels, and belt disengageable means for disengaging the cylindrical belt from said hangers at loading and unloading stations in the path of travel thereof. The belt and the rope are driven in synchronously interlocking relation so that both the belt and the rope are equally loaded, thereby avoiding displacement in position between them during operation.

4 Claims, 8 Drawing Figures

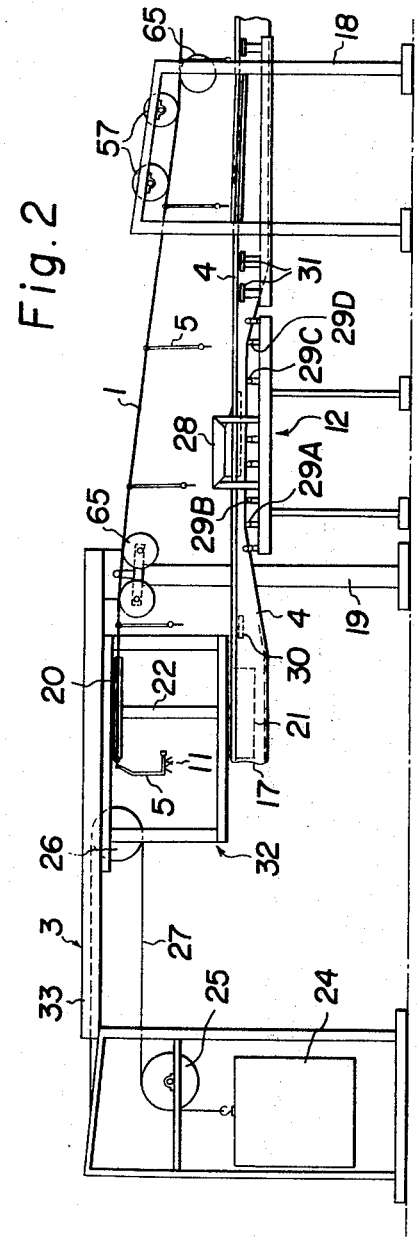
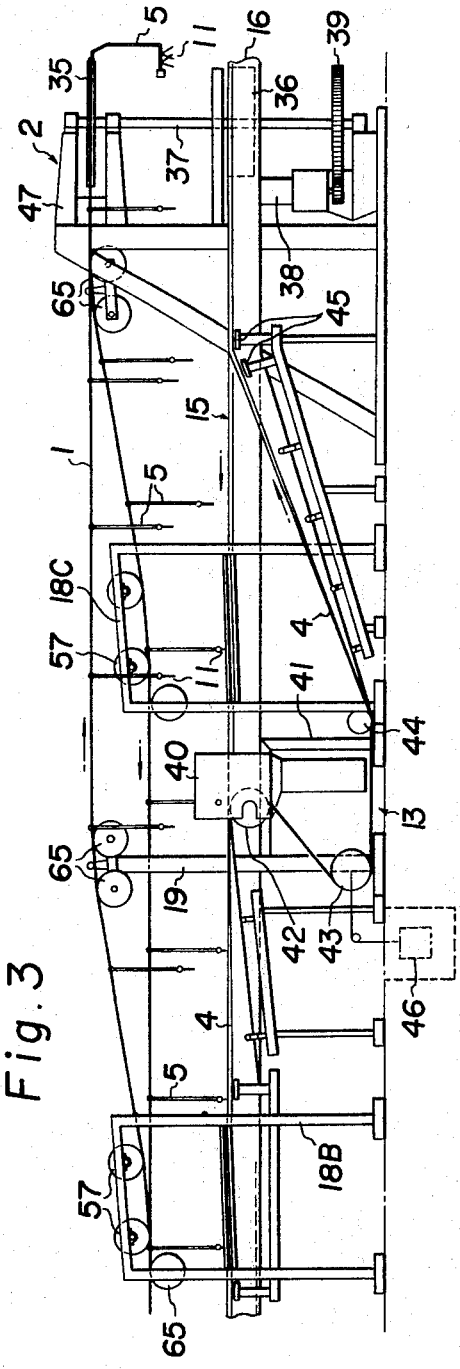
Fig. 2
Fig. 3

CYLINDRICAL BELT CONVEYOR SYSTEM

BACKGROUND OF THE INVENTION

1. Field of the Invention

This invention generally relates to a conveyor system adapted to cause a cylindrical belt having materials to be conveyed, such as granular or powdered materials carried therein and completely sealed in a condition of being suspended from wire ropes, to travel in a circulating fashion.

2. Description of the Prior Art

Belt conveyor systems used to convey materials by way of a flat belt traveling on carrier rollers are well known. Such flat belt-type conveyors, however, possess several disadvantages, the most notable of which is the unavoidable dispersion of the materials to be transported when granular materials or the like are transported, and in addition thereto, the unsuitableness in the case of long distance transportation, or in the case of an inclined transportation. In order to overcome the various disadvantages noted above with respect to flat belt conveyors, cylindrical belt conveyors have been developed. In the cylindrical belt conveyor, wire ropes are mounted along the traveling passage of the belt to suspend the belt therefrom, and the belt is caused to travel in circulating fashion at a predetermined speed. In this case, the conveyor belt is cylindrically held, and materials to be transported are transported while being carried within the cylindrical belt. With this arrangement, the materials to be transported were completely prevented from being dispersed during a period of transportation, and further belt-transportation of the material for a long distance was made possible, even if the site involved ups and downs, or were inclined, by the mere provision of wire ropes mounted in a manner similar to that of a ski lift in the Gelande or a slope.

To achieve reliable and more effective operation and to achieve operation with a minimum of damage to the belt, it is extremely important for the rope-suspension type cylindrical belt conveyor to move both the rope and the belt in a well balanced condition to minimize rocking of the belt for maintaining safety of a high degree and to ensure the operation of engaging and disengaging the belt as required when a belt gripper, which is used to suspend the belt from the rope, is engaged with or disengaged from the belt before and behind the loading station or unloading station of the materials to be transported.

Where the arrangement is made in a traveling belt so that only a suspending rope is driven to let the belt follow the travel of the rope, the full load of the horizontal or forward movement of load and the belt-supporting vertical load is dynamically loaded upon the rope. For this reason, a greater rope driving force becomes necessary and the degree of fatigue of the rope will increase, to thereby cut the service life of the rope, and in addition, there is a tendency showing a delayed response of the follower belt in starting, traveling and stopping of the rope. Further, the traveling inertia becomes extremely unbalanced, particularly due to the difference in load between the loaded side where materials to be transported are loaded and the return side where no load is carried, and the difference in load, even on the loaded side, due to the one-sided placement of materials to be transported on the belt, and as a result, the response of the belt to the rope is greatly delayed and partly differs, to unavoidably produce rocking and strain of the belt, resulting in disengagement or displacement of the belt gripper from the belt, and in the limitation of the belt traveling speed.

SUMMARY OF THE INVENTION

It is therefore an object of the present invention to increase the traveling stability of both the belt and the rope in a cylindrical belt conveyor system of the type characterized herein, thereby reducing the operational driving force as much as possible.

It is a further object of this invention to provide a cylindrical belt conveyor system which is designed to operate with a minimum of damage to the belt, and thus to provide long service life, and which yet is economical to produce.

It is another object of this invention to provide a novel cylindrical belt engaging-and-disengaging device which ensures the operation of engaging-and-disengaging between the belt and the belt gripper in cylindrical belt conveyor systems of the type described herein.

It is yet another object of this invention to provide a new and improved belt gripper which can firmly grip a cylindrical belt and which can be disengaged without difficulty.

One characteristic feature of this invention which enables the accomplishment of the foregoing objects, as well as others, is its capability to pass turn portions on the opposite ends of a cylindrical belt over turn pulleys similarly to a wire rope wherein turn portions on the opposite ends are passed over pulleys, whereby both the wire rope and the conveyor belt may be synchronously driven in interlocking relation. With the provision of such synchronous interlocking driving between the conveyor belt and the wire rope suspending the belt as described above, both the belt and the wire rope equally bear part of the load imposed thereupon in the horizontal, or the forward, direction, thereby to greatly improve the driving efficiency over that which is afforded by conventional structures wherein only the wire rope bears the whole load, resulting in operation at good speed with and with decreased driving force. Further, this arrangement of the present invention provides various advantages, such as, for example, that displacement in the traveling position between the belt and the rope seldom, if ever, occurs, the shock due to inertia produced in starting or stopping may be mimimized, and the rocking and strain of the belt may be completely eliminated.

In accordance with another characteristic of this invention, a belt hanger adapted to suspend the conveyor belt from the rope comprises an L-shaped hanging lever that comes down from the rope and a pair of bell-cranklike members, a face angle portion of the member being rotatably journalled to the hanging lever, a bifurcated member internally positioned and crossed to each other forming a belt gripping lever, and a bifurcated member externally positioned forming an opening and closing operating lever, whereby the edge of the conveyor belt may be gripped or the belt being gripped may be released in only a simple operation, such that the gripping lever is opened and closed by forcing the operating lever from both sides toward the inside.

In accordance with a further characteristic of this invention, the opening and closing operation of the aforementioned belt gripper may be carried out in a completely automatic manner by a belt-disengageable means which comprises a pair of pressing belts disposed on opposite sides of a conveyor belt travel passage and driven in synchronizing relationship with the conveyor belt. The belt-disengageable means are disposed at least before and behind the loading station of materials to be transported and before and behind the unloading station thereof in the conveyor belt travel passage, and the belt gripper is arranged so as to pass through between a pair of disengageable belts, so that when the belt gripper is passed therethrough, the opening and closing operating lever is forced by the pressing belts to engage with or disengage the conveyor belt from the gripper in a completely automatic manner.

BRIEF DESCRIPTION OF THE DRAWINGS

Various other objects, features and attendant advantages of the present invention will be more fully appreciated as the same becomes better understood from the following detailed description when considered in connection with the accompanying drawings, wherein like reference numerals designate like or corresponding parts throughout the several figures and in which:

FIG. 2 is a fragmentary elevation illustrating the tensioned end of the conveyor belt and rope of the system shown in FIG. 1, including a material supply station;

FIG. 3 is a fragmentary elevation illustrating the driving end of the conveyor belt and rope of the system shown in FIG. 1, including a material discharge station;

DESCRIPTION OF THE PREFERRED EMBODIMENT

Figure 1:
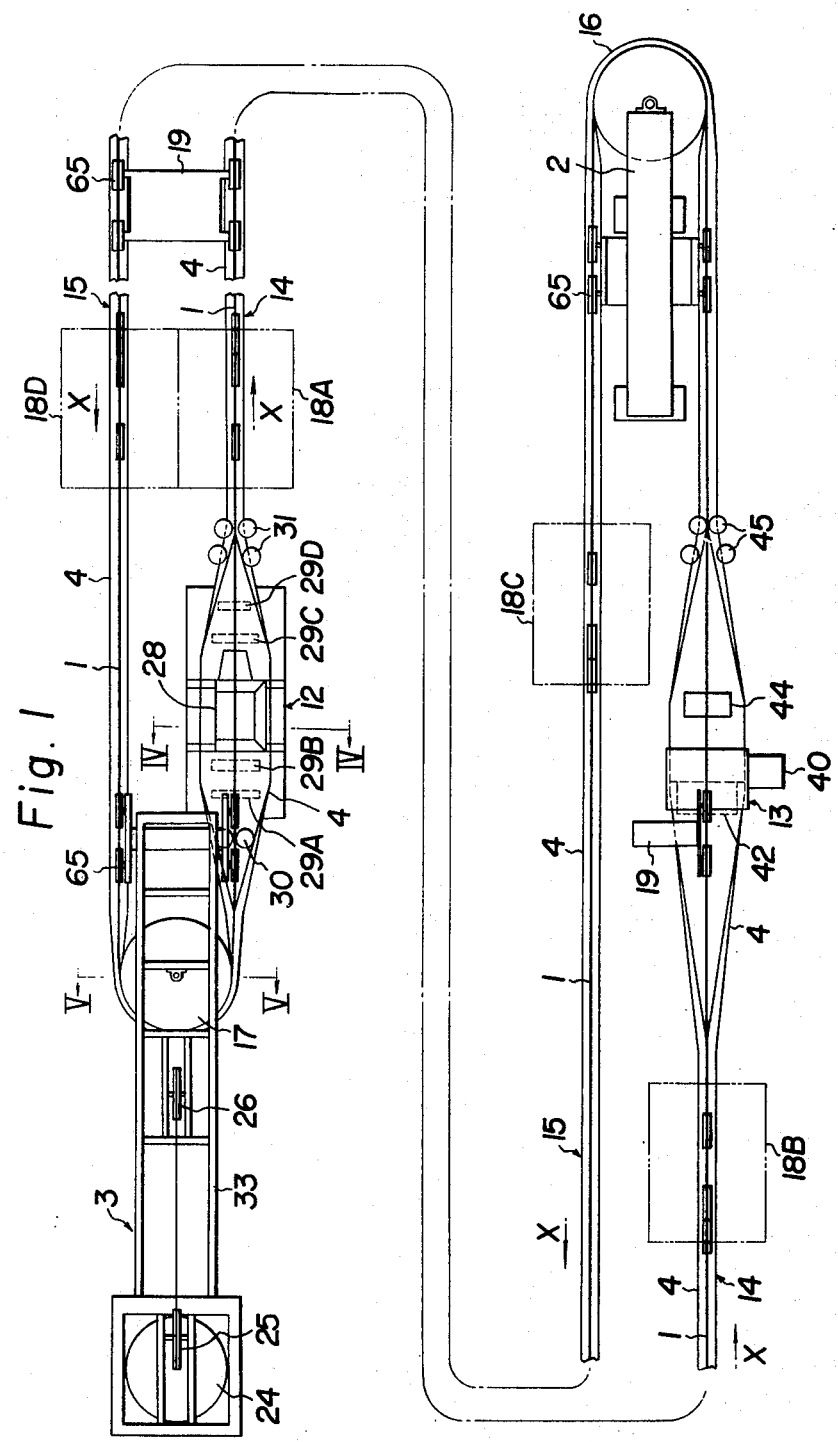
FIG. 1 is a plan view illustrating a conveyor system according to the present invention, with its intermediary portion omitted and divided into two sections.
Figure 4:
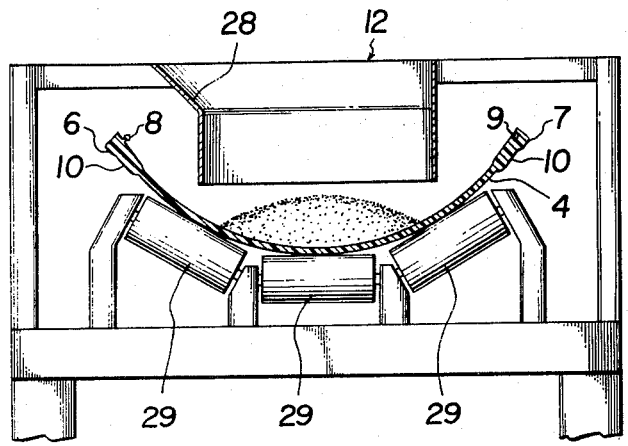
FIG. 4 is a sectional view taken along the line IV—IV in FIG. 1.

First, the arrangement of the apparatus according to the present invention will schematically be described, reference being made primarily to FIGS. 1 and 2. A cable-rope 1 arranged in an endless manner is passed over a set of pulleys between a driving gear 2 at one point and a tension device 3 at another point, and an endless conveyor belt 4 disposed along the travel passage of the rope 1 is suspended, to be traveled therealong, by means of hangers 5 suspended from the rope 1. This conveyor belt 4 is preferably made of rubber or a plastic material, such as resilient synthetic resin or the like.

The construction of the belt 4 will be described with reference being made particularly to FIG. 7, which illustrates the belt in the form of a cylinder. Inflated ear-like portions 6 and 7 are formed on opposite side edges of the belt 4, and the ear-like portions 6 and 7 are provided on their inner walls with a projection 8 and a channel 9, respectively, which are adapted to engage hookwise such that the belt 4 is held in a cylindrical form in a manner so as to check opening of the belt to some extent. A neck portion 10 located below the inflated ear-like portions 6 and 7 is firmly gripped by a gripper, generally designated by the reference numeral 11, to suspend the belt 4.

This conveyor belt 4 is flattened in a material supply station 12 and a discharge station 13 while it is cylindrically formed in straight traveling portions of a loaded side 14 loaded with materials and a return side 15 unloaded, and in turn portions 16, 17 on the sides of the driving gear 2 and the tension device 3. Disengageable means 18A, 18B, 18C and 18D, which have their function to disengage the belt 4 from the belt hanger 5 and conversely to let the hanger 5 grip the belt 4, are disposed along the traveling direction of the belt 4, or rope 1, directly behind the supply station 12 on the load side 14, directly before the discharge station 13, directly behind the driving turn portion 16 on the return side 15, and directly before the tension-turn portion 17. Accordingly, the belt 4 is suspended by the hanger 5 when the former passes between belt disengageable means 18A and 18B, and between means 18C and 18D, while the belt 4 is entirely separated from the belt hanger 5 when it is between the belt-disengageable means 18B and 18C, passing through the discharge station 13 and the driving turn station 16, and between the belt disengageable means 18D and 18A, passing through the tension turn portion 17 and the supply station 12. A post 19 is suitably disposed in the rope 1 travel passage, being provided at the upper end thereof with guide wheels 65 adapted to support the rope 1.

The general arrangement of the conveyor according to the present invention having been described, the various components thereof will now be described in detail.

Referring now to FIG. 2, there are shown the material supply station 12 and the tension turn station for the belt 4 and the rope 1. A U-shaped pulley 20 over which the cable-rope 1 is passed and a wheel 21 over which the belt 4 is passed are connected by a rotative shaft 22 and are thus rotated in interlocking relation. As shown further in FIG. 5, which is a sectional view, the belt wheel 21 is relatively wide in width and has its upper side formed with a channel 23 in engaging relation with the inflated ear-like portion 6 of the belt to be passed over. A box-shaped sliding frame 32, with which pulley 20 and wheel 21 are supported, is slidably carried by a fixed frame 33 made of a channel steel. A tensioning counter weight 24 exerts the proper tensile strength upon the rope pulley 20 and the belt wheel 21 through a rope 27 passed between a wheel 26 mounted on the sliding frame 32 and a wheel 25 mounted on a fixed tower.

A hopper 28 is mounted on the material supply station 12. The configuration and construction of the hopper 28 are usually determined according to the kind of materials to be transported, similarly to those of a chute 40 to be described. A plurality of carrier rollers 29 are disposed in suitable angular relation from one another on the frame base located below the hopper 28.

The belt 4 released from the belt hanger 5 by the belt disengageable means 18D on the belt return side 15 is turned by the turn wheel 21 without changing its cylindrical posture and is gradually released from the cylindrical posture into a U-shaped or flattened posture while the inflated ear-like portions 6 and 7 are separated by a guide roller 30 at the entrance of the supply station 12 and the carrier rollers 29A, 29B, and then the belt 4 passes directly below the supply hopper 28. At this time, the materials to be transported, such as powdered materials and the like, are fed onto the belt 4, which is further reformed gradually into its cylindrical configuration by the carrier rollers 29C, 29D at the outlet side to reengage the inflated ear-like portions 6 and 7 through the guide roller 31. Thus, the belt is again suspended by the hanger 5 through the belt disengageable means 18A on the loaded side 14, and the materials to be transported accommodated into the cylindrical belt are conveyed towards the discharge station 13.

Turning now to FIG. 3, there are shown the discharge station 13 for the materials to be transported and the driving turn portion 16. A driving pulley 35 for the wire rope 1 and a driving wheel 36 for the conveyor belt 4 are connected by a driving shaft 37 and are rotated in interlocking relation. Driving means 38, such as an electric motor, transmits a rotative driving force to the driving shaft 37, through a conveyor belt or a toothed wheel 39, and exerts a synchronized transporting force upon both the wire rope 1 and the belt 4. The rope driving pulley 35 and the belt driving wheel 36 have their configuration similar to that of the above-described pulley 20 in the tension turn portion and the wheel 21. The diameter of the rope driving pulley and the belt driving wheel 36 is predetermined so that the rope and the belt will have the same traveling speed. The chute 40 disposed in the discharge station 13 is mounted on a suitable frame base 41. Disposed on the frame base 41 are a discharging roller 42 positioned within the chute 40, a tension roller 43 and an idle roller 44 positioned below the frame. A counter-weight 46 is designated at 46. The cylindrical belt disengaged from the hanger 5 by the belt disengageable means 18B at the extreme end of the loaded side 14 is gradually released to come into a completely flattened form and is then passed over the discharging roller 42, thereby discharging the materials on the belt into the chute 40. Thereafter, the belt 4 in the flattened form is passed over the tension roller 43 and the idle roller 44 in a Z-shaped configuration while being moderately tensioned and passes through the discharge station 13. The belt is then gradually reformed into its cylindrical configuration by the guide roller 45 to engage the projection 8 with the channel 9 in the inflated ear-like portions 6 and 7 and is then transferred to the return side through the driving wheel 36, maintaining the cylindrical posture. Again, the belt is gripped by the belt hanger 5 by means of belt disengageable means 18C mounted at a starting position of the return station so as to be transported in the suspended condition.

Figure 6:
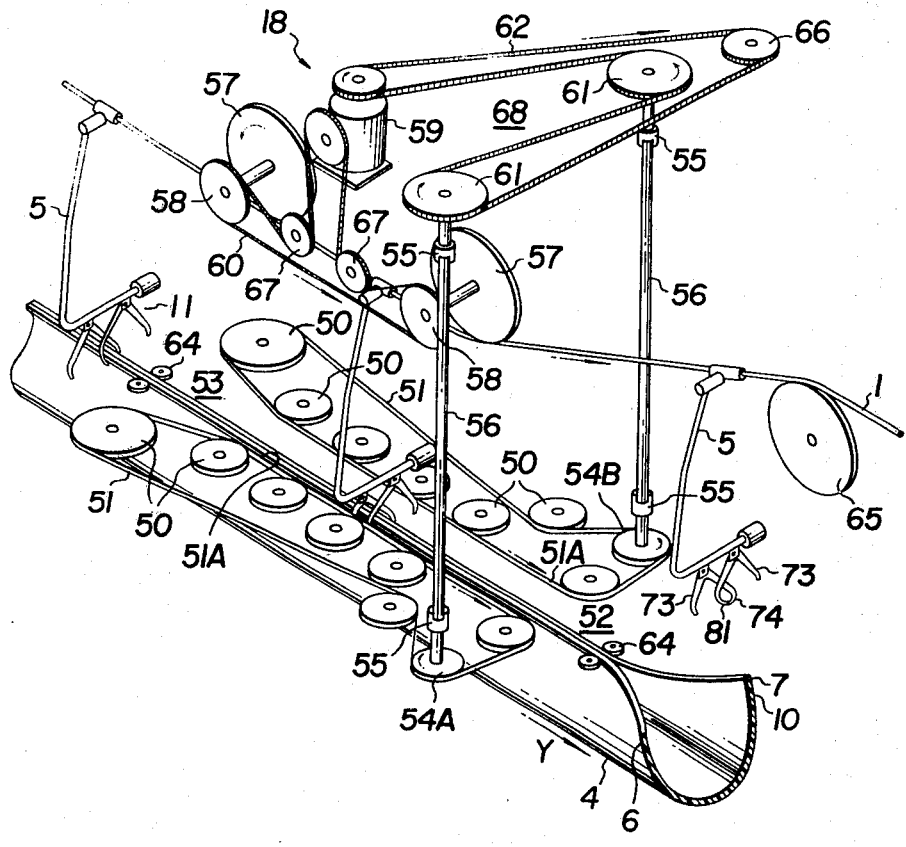
FIG. 6 is a perspective view of a belt disengageable device according to this invention, illustrating a principal part only, with support shafts and frames in various parts omitted therefrom for clearness of explanation.

As is shown in FIG. 6, the belt disengageable means 18 comprises a pair of pressing belts 51 symmetrically opposed along the traveling direction of the cylindrical belt 4 and a synchronous driving mechanism 68 adapted to drive the pressing belts 51 in circulating relation in synchronization with the transporting speed of the cylindrical belt 4.

The pressing belts 51 are movably passed over a plurality of V-pulleys 50. Between opposite faces 51A of the pressing belts 51 is formed a substantially parallel spacing 52 which serves to be a passage through which a belt gripper 11 passes. The spacing 52 has its width formed narrower than the dimension of an outer width between operating levers 73 on both sides of the gripper 11 in the condition where the belt is gripped. On the admission side of the hanger 5, there is formed a more widely opened admission passage 53.

One pulley 54 of the pulleys over which each of the pressing belts 51 is passed is a pulley adapted to drive its belt 51, and this pulley 54 is connected with the synchronous driving mechanism 68 mounted at the upper part by a driving shaft 56 provided with a universal joint 55.

A guide pulley 57 for the wire rope 1 has a toothed wheel 58 coaxially secured thereto, and a chain 60 is passed between the toothed wheel 58 and a gear box 59. Further, the aforementioned driving shaft 56 also has its upper end provided with a toothed wheel 61, and a chain 62 is passed between the toothed wheel 61 and the gear box 59. The traveling force of the wire rope 1 is transmitted to the chains 60, 62 and finally to the pressing belts 51 through the shaft 56, thus achieving synchronization in the traveling speeds of the rope 1 and the pressing belts 51. Accordingly, the transmission ratio between the toothed wheels 58 and 61 and the driving pulley 54 is determined so that the rope 1 and the disengageable belt 51 will have synchronous speed. Also, in an effort to make the opposite faces 51A of the disengageable belt 51 move in the same direction, the transmission chain 62 is tightly passed over so as to reverse the rotative directions of driving pulleys 54A and 54B. Wire guide pulleys are designated at 66 and 67.

The operation and effect of the belt disengageable means 18 will now be described, with reference particularly to FIG. 6, by way of the case where the belt gripper 11 is disengaged from the cylindrical belt 4. When the belt hanger 5 with cylindrical belt 4 suspended therefrom is admitted gradually through the admission passage 53 to pass through the passage 52, the left and right operating levers 73 are placed between the pair of disengageable belts 51, 51a to be forced inwardly whereby they are oppositely rotated, as indicated in dotted lines in FIG. 7, thereby to release the gripping levers 74 to disengage the cylindrical belt 4 therefrom. At this time, since the disengageable belts 51 travel at the same speed as that of hanger 5, the relative speed thereof with the hanger 5 becomes zero, to firmly hold the operating lever 73 of the hanger from the admission passage 53 to the parallel passage 52 thus enabling the exertion of a pressing force in a direction at right angles to the forward travel direction Y, shown in FIG. 6, whereby the most ideal disengageable operation may be accomplished without applying strain energy to the cylindrical belt and hanger. The synchronous travel of the hanger and disengageable belt 51 rarely causes the hanger to be twisted because of the sliding produced between the hanger and the disengageable belt 51 because of the self-repelling power of the hanger. In order to obtain increased reliablility, however, the disengageable belt 51 may also be designed in the form of a V-belt having its surface flattened and or a V-belt having its surface formed with concave-and-convex figure, such as a wave, saw-tooth, or square waveform.

The hanger 5 with the gripping levers 74 opened gradually moves upwards in inclining fashion with respect to the surface of the cylindrical belt 4 to completely separate from the cylindrical belt 4, which is then released. Therefore, if the disengageable belts 51 are disposed along the traveling inclination of the hanger, that is, along the path of the wire rope, removal or gripping of the cylindrical belt from the hanger is assured. The cylindrical belt 4 released from the hanger is then held by the guide rollers 64 and travels to the next operational station.

In the case where the cylindrical belt 4 is to be gripped by the hanger, the respective travel directions of the wire rope 1, the conveyor belt 4 and the disengageable pressing belts 51 are reversed to that shown in FIG. 6, and the admission passage 53 is formed on the admission side of the hanger 5. Then, the hanger 5 gradually comes close to the cylindrical belt 4 with the gripping levers 74 open to allow the belt inflated ear-like portion 7 to enter the gripping lever 73, and the belt neck portion 10 is pressed and supported by the pressing lever 74 instantaneously when the operating lever 73 is disengaged from the pressing belt 51 at the rear of the pressing belt 51.

Figure 7:
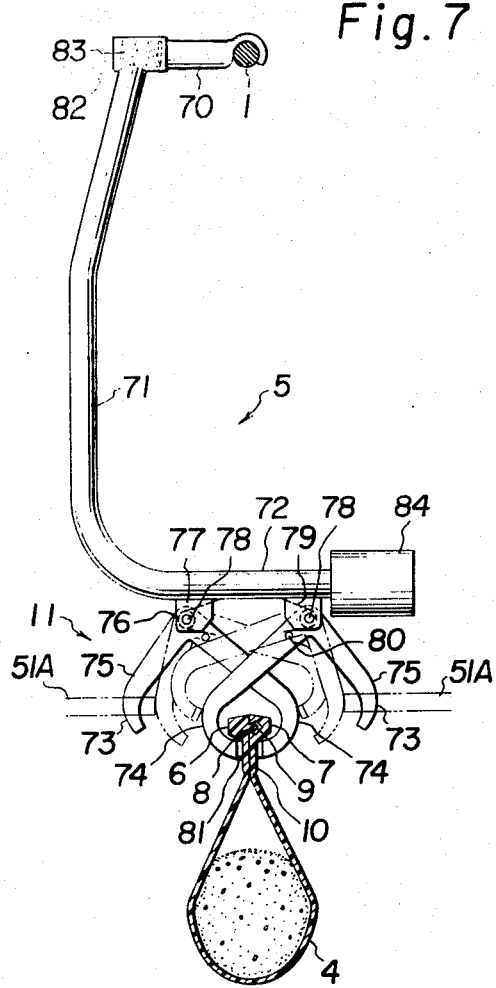
FIG. 7 is a front view of a belt hanger according to this invention.
Figure 8:
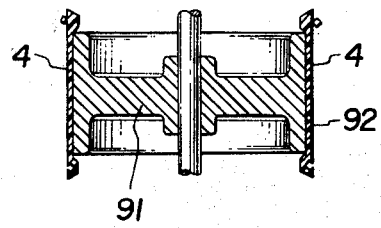
FIG. 8 is a sectional view showing an improved method of mounting a conveyor belt.

As shown in FIG. 7, the belt hanger 5 comprises a fixed body 70 mounted on the wire rope 1, an L-shaped hanging lever 71 connected to the fixed body 70, and a belt gripper 11 disposed on the horizontal arm 72 of the lever 71. The gripper 11 is constituted by a pair of bell-crank-like members 75 comprising an operating lever 73 and a gripping lever 74, the gripping levers 74 being symmetrically crossed from one another so that operating levers 73 are externally positioned, and a face angle portion 76 of the bell-crank-like member is rotatably mounted on the hanging lever horizontal portion 72 through a bracket 77. A twist spring 79 is retained on a rotative shaft 78 to exert a heading force on the gripping lever 74 in the direction of the pressing by the conveyor belt. A stop pin for the spring is designated at 80. A portion in the vicinity of the extremity of the gripping lever 74 is curved, to which a belt gripping plate 81 is fixed. Pressed and supported between the gripping plate 81 and the other gripping plate oppositely arranged thereto is the belt neck portion 10. When both operating levers 73 are inwardly forced, the gripping members 74 are rotated, as indicated in dotted lines, about the shaft 78, to widely open the extremity of the gripping levers 74. A twist spring is internally retained in a connecting pipe member 82 secured to the upper end of the hanging lever 71 to absorb the rocking of the hanger 5 in the moving direction, thereby to provide a firm belt gripping operation in the belt disengageable means. A balancing weight is designated at 84, being disposed at the free end of the horizontal arm 72 of the lever. The belt hangers constructed as described above are disposed on the rope 1 in equally spaced relation.

Figure 5:
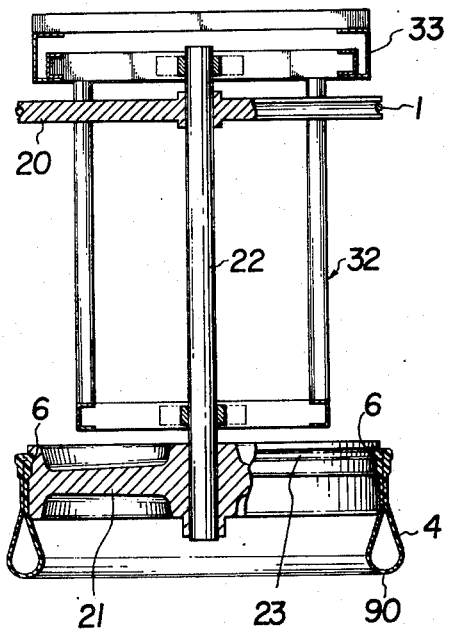
FIG. 5 is a sectional view taken along the line V—V in FIG. 1.

As hereinabove described, the conveyor system of the present invention is designed to drive both the cylindrical belt 4 and the wire rope 1 supporting the belt in synchronously interlocking relation, so that the load in the horizontal, or moving, direction, heretofore loaded upon only the rope, may be shared with the belt, thereby to extremely improve the driving efficiency and to provide better operation with a minimum driving power. Further, reduction of the load on the wire rope results in decreased fatigue of the rope, thus extending the service life thereof. Furthermore, the rope and the conveyor belt are driven in synchronous relation and at the same speed, so that displacement of the traveling position between the rope and the belt is never produced, and any shock given to the rope, as may be caused by the inertia of the belt at the time of starting and stopping, can be minimized so that rocking and strain of the belt may be substantially avoided. Moreover, since the conveyor belt on the return side is also moved in a cylindrical posture, the return belt may be used to serve as a belt for transportation of other materials to be transported. Of course, it is not always necessary to arrange the reciprocating belt passages in parallel relation, but they may economically be modified in response of need.

Where the conveyor belt 4 is passed over turn wheels 21 and 36 at the turn portions 16 and 17, as shown in FIG. 5, the bent portion 90 of the belt 4 is squeezed hard and as a result, the belt will have a way of breaking, depending upon the quality thereof, to weaken that portion, thereby sometimes tending to produce cracks or damages thereto. In an effort to avoid this unfavorable phenomenon, the belt 4 can be passed over the turn wheel 91 in a flattened form. That is, the belt 4 adjacent to the turn wheels in the turn portions 16 and 17 is passed over the wheel 91 by twisting at approximately 90° from a flattened and horizontal state of the belt to be positioned perpendicularly to the belt surface 92, and the belt surface is again returned to the horizontal state after it has been passed through the turn wheels. Auxiliary guide rollers and the like are helpful to facilitate changing modes, that is, from the horizontal state to the vertical state, and vice versa. The turn wheels 91 used in the improved apparatus, as described above, are mounted in a manner similar to that shown in FIG. 5, except that the former has a wheel width surface wider than that of the latter. Thus, the provision of the belt 4 being passed in a flattened state completely eliminates damages to the belt caused by the bending thereof, and further widens the contact surface between the belt and the wheel, thereby to increase transmission efficiency of belt driving power, resulting in a greatly effective and positive operation of the belt.

Obviously many modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A suspension type cylindrical belt conveyor system comprising:
    a rope tensionally passed in endless fashion between a driving pulley and a tension pulley;
    a cylindrical conveyor belt passed in endless fashion between a driving wheel and a tension wheel and being disengageably suspended from said rope through a plurality of hangers so as to be released therefrom at least in a supply station and a discharge station of materials to be transported;
    driving means adapted to drive said driving pulley and said driving wheel in interlocking relation so as to drive said rope and said conveyor belt in a synchronously circulating fashion; and
    belt disengageable means disposed along the path of travel of said conveyor belt directly behind said material supply station, directly before said material discharge station, directly behind said driving wheel and dirctly before said tension wheel for operating said hangers to grip and support said conveyor belt in a cylindrical posture directly behind said material supply station and directly behind said driving wheel while disengaging said hangers from said conveyor belt directly before said material discharge station and directly before said tension wheel.

2. A suspension type cylindrical belt conveyor system according to claim 1, further comprising means for stretching a belt surface of said cylindrical conveyor over said driving wheel and said tension wheel in a flattened posture so as to pass and turn said belt thereover.

3. A suspension type cylindrical belt conveyor system according to claim 1, wherein each of said belt hangers comprises:
an L-shaped hanging lever;
means for securing a top end of said lever to said rope for being carried thereby; and
a belt gripper including a pair of bell-crank-like members having parts symmetrically crossed and a face angle portion rotatably journalled to a horizontal lever portion of said hanging lever, a bifurcated member internally positioned in said bell-crank-like member being curved so that free ends thereof are opposed to form a belt gripping lever, and another bifurcated member externally positioned in said bell-crank-like member being inwardly forceable to form an opening and closing operating lever for opening and closing said belt gripping lever.

4. A suspension type cylindrical belt conveyor system according to claim 3, wherein said belt disengageable means comprises:
a pair of endless pressing belts symmetrically disposed in facing but spaced relation from one another along the path of travel of said conveyor belt in the conveyor system to form a belt hanger passage and adapted to force said another bifurcated member of said belt gripper so that said belt gripper may be opened and closed; and
synchronous driving means using a traveling force of said rope for traveling said pressing belts in such a manner that opposed portions of said belts are placed in the same direction and speed as that of said conveyor belt.

* * * * *